(12) United States Patent
Robinson

(10) Patent No.: US 6,963,926 B1
(45) Date of Patent: Nov. 8, 2005

(54) PROGRESSIVE ROUTING IN A COMMUNICATIONS NETWORK

(75) Inventor: Gerald A Robinson, Beoley (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/936,287

(22) PCT Filed: Mar. 16, 2000

(86) PCT No.: PCT/GB00/00982

§ 371 (c)(1),
(2), (4) Date: Sep. 12, 2001

(87) PCT Pub. No.: WO00/59240

PCT Pub. Date: Oct. 5, 2000

(30) Foreign Application Priority Data

Mar. 31, 1999 (GB) ................................. 9907436
Jul. 8, 1999 (EP) ................................. 99305451

(51) Int. Cl.[7] ................................. G06F 15/173

(52) U.S. Cl. ................. 709/239; 709/242; 370/389

(58) Field of Search ............................ 709/238–244; 370/235, 389, 392, 395.1

(56) References Cited

U.S. PATENT DOCUMENTS 5,430,729 A * 7/1995 Rahnema ................. 709/242
5,455,865 A 10/1995 Perlman (Continued)

FOREIGN PATENT DOCUMENTS

EP         0634878 A2      7/1994
WO         WO 97/16005  *  5/1997  .......... H04L 12/56

OTHER PUBLICATIONS

Pang, Vincent Yeow Chieh; and Irvine-Halliday, Dave, "A Fail Safe Temporary Reorganization Procedure for STAR-MAP Routing Tables in the Event of a Primary Hub or Link Failure," 1996 Canadian Conference on Electrical and Computer Engineering, May 26-29, 1996.*

(Continued)

Primary Examiner—Patrice Winder
Assistant Examiner—Victor Lesniewski
(74) Attorney, Agent, or Firm—Nixon & Vanderhye P.C.

(57) ABSTRACT

A routing algorithm has particular advantage in sparsely connected networks in which nodes have a ranked set of alternative routes to a destination node, these routes being node-disjoint. Setup messages have an additional information element for the identity of a virtual source node, and a source node inserts its own identity in the virtual source information element. Unless a node is the destination for a message, it examines the content of the virtual source information element of a message, and if there is no match with its own identity it selects from its routing table a predetermined alternative route for the destination node. If that route is unavailable, the node replaces the content of the virtual source information element with its own identity, performs routing on the basis that there is now a match with its own identity, i.e. it behaves as if it had generated the message. It selects from its routing table the highest ranking of the set for the destination node, and in the event of a fault on the highest ranking route, tries one or more lower ranking routes. If no route is available, the node replaces the content of the virtual source information element with the identity of the node from which it was received, and sends the message back to the node from which it was received.

6 Claims, 5 Drawing Sheets

U.S. PATENT DOCUMENTS 5,638,516 A * 6/1997 Duzett et al. ............... 709/239
5,649,108 A 7/1997 Spiegel et al.
6,151,319 A * 11/2000 Dommety et al. ..... 370/395.52
6,542,469 B1 * 4/2003 Kelley et al. ............... 370/238

OTHER PUBLICATIONS

Chung, Jae-Yeul, "A Predictive Alternate Path Routing Scheme Supporting the Best QOS in ATM Networks," 1998 International Conference on Communication Technology Proceedings, Oct. 22-24, 1998.*

Crawley et al., "RFC 2386: A Framework for QoS-based Routing in the Internet," www.ietf.org, Aug. 1998, 35 pages.*

Heggestad, "Steady-State Performance of an Adaptive Sequential Routing Algorithm", Proceedings of the National Telecommunications Conference (NTC '81), New Orleans, LA Nov. 29-Dec. 3, 1981.

* cited by examiner

| SOURCE | DESTINATION | ADDRESS |
|--------|-------------|---------|
|        |             |         |
| C1     | D           | D       |
| C2     | D           | B       |
|        |             |         |
| B      | D           | D       |
|        |             |         |

| SOURCE | DESTINATION | ADDRESS 20B |
|---|---|---|
| B1 | D | H |
| B2 | D | C |
|  |  |  |
|  |  |  |
| S | D | H |
|  |  |  |
|  |  |  |
|  |  |  |

Fig. 5

PROGRESSIVE ROUTING IN A COMMUNICATIONS NETWORK

BACKGROUND OF THE INVENTION

1. Field of the Invention

This invention relates to a method of routing in a communications network of interconnected nodes, and particularly, but not exclusively, to a method of routing in a sparsely connected network.

2. Related Art

A number of routing algorithms are known for routing in a network of interconnected nodes. For example, in the event of a fault preventing a message from being forwarded from a transit node to an adjacent node, the message is sent on an alternative route to that adjacent node via another transit node. In another example, known as source node routing, if there is a fault on a primary route to a destination node, the message is returned to the source node and a secondary route is tried from the source node to the destination node.

U.S. Pat. No. 5,649,108 (Spiegel et al.), issued 15 Jul. 1997, discloses a routing algorithm in which a source node, having a routing table containing, for each destination node, first choice, second choice, etc. complete end-to-end routes, i.e. each such route being a list of those nodes that a connection setup packet should pass through to establish a connection, selects one of first and second routing mode flags and selects from its routing table the first choice route to a destination node in response to a connection request. The source node generates a connection setup packet having a source route field, a record route field (for containing a list of those nodes through which the connection has already been established), a cumulative cost field, a cost threshold field, a crankback limit field, and a routing mode flag field. The source node copies the first choice end-to-end route from its routing table into the source route field, and establishes a connection to a first intermediate node located along the first choice route by sending the connection setup packet to that first intermediate node.

The first intermediate node is responsive to the first routing mode flag for extending the connection along the first choice route, i.e. testing the link to the next node of the first choice route as defined by the source route field and sending the packet to that next node if the link is available, and for updating the record route and cumulative cost fields.

If that link is not available, operation of the intermediate node is determined by which of the routing mode flags has been set. If the second routing mode flag has been set for that setup packet, i.e. requiring source node routing, then the first intermediate node sends a NACK to the source node. Upon receipt of the NACK, the source node releases that connection and generates a new setup packet, copying the stored end-to-end second choice route into the source route field of that new setup packet. However, if the second routing mode flag has been set for that setup packet, then that intermediate node records that link as being blocked for this connection, and attempts to find a new path tail from itself to the destination node by determining whether there is another path available in its routing table which has not been tested before. If there is, a path is selected and tested by adding the cost to the cumulative cost and comparing the new cumulative cost with the cost threshold. If the new cumulative cost is too high, control loops back to selecting from that routing table another path from among the possible paths to the destination node. If the new cumulative cost is not too high, the new path is checked to see whether it includes any links recorded as being blocked for this connection, and, if so, control loops back again to select another new path. If the new path does not include any blocked links, a check is made to see whether the new path causes any loops, and if so whether a crankback to the previous node would exceed the value in the crankback limit field. If the crankback limit would be exceeded, control loops back again to select another new path, but if not, then the crankback limit field is decremented from its initial value of one, and the setup packet cranked back to the previous node. On receipt of a cranked back setup packet, a node decrements the cumulative cost field in respect of the link from the cranking back node, removes that node's identifier from the record route field, and proceeds to find a new path tail from itself to the destination node.

In the event that an intermediate node fails to extend the connection along the first choice route, it will try to find a new path tail by repeatedly selecting and testing one of its respective set of first choice, second choice, etc. paths to the destination node until either a suitable path is found or all the paths have been tested.

Thus it can be seen that in Spiegel et al. the routing table in each node has to contain, for each respective destination node, a set of complete end-to end routes for copying into the source route fields of the setup packets. Conventionally, for such a routing algorithm there would be in the region of six to eight alternative routes for each destination node.

The article "Steady-State Performance of an Adaptive Sequential Routing Algorithm" by Harold M Heggestad, Proceedings of the National Telecommunications Conference (NTC '81), New Orleans, La., USA, 29 Nov. to 3 Dec. 1981, discloses a spill-forward routing algorithm and a sequential routing algorithm. In the spill-forward routing algorithm, each node has a routing table containing for each destination node a list of the links leaving that node ranked in order of their link blocking probabilities, and has a three-fold call attempt process, namely (1) a link leaving a source node is tried if and only if all links above it in the routing table are blocked, (2) when an intermediate node is reached, control is passed ("spills forward") to it as if it had become the source node, and (3) when a call request is blocked at all exits from a node, it is dropped and re-initiated by the originator. In the sequential routing algorithm, which is a modification of the spill-forward routing algorithm, each node has a routing table similar to that for the spill-forward routing algorithm, and has a three-fold call attempt process, namely (1) a link leaving a source node is tried if and only if all links above it in the routing table are blocked, (2) a call request which is blocked at all exits from an intermediate node is cranked back to the closest preceding node having any still-untried links, and (3) a call request is ultimately blocked if and only if every possible source node/destination node route is blocked. When a node sends a call request packet to a neighbouring node, it extends a route history in the call request header by adding a field containing its own identity, the neighbouring node identity and an indication of whether the packet is being forwarded or returned.

Thus it can be seen that in Heggestad each node always acts in source mode and will only crankback a packet when all exits have been tried and found to be blocked.

In accordance with one aspect of the present invention, there is provided a method of routing a message in a communications network of interconnected nodes, the nodes being arranged to generate messages, each message having a destination information element containing the identity of a destination node for that message, a source information element containing the identity of the source node of that message, and a virtual source information element initially containing the identity of that source node, and each of the nodes having a respective routing table containing respective entries corresponding to source node/destination node pairs, each entry being in the form of a ranked pair of alternative next hop routes, the method comprising performing at a said node the steps of:

(a) comparing its own node identity with the destination node identity of a message to be routed; and, when it is not the destination node for that message, (b) comparing its own node identity with the virtual source node identity of that message, and, if there is a match at step (b), (c) operating in source mode, else, (d) operating in transit mode;

wherein step (c) comprises the substeps of (e) accessing its routing table in accordance with the virtual source node/destination node pair of that message to find the corresponding entry, (f) forwarding the message to the higher ranking next hop route of that corresponding entry, and in the event that step (f) fails, (g) forwarding the message to the lower ranking next hop route of that corresponding entry, and in the event that step (g) fails, (h) replacing the content of the virtual source information element of the message with the node identity of the node from which that message was received, and (i) sending that message back to that node from which it was received; and wherein step (d) comprises the substeps of (j) forwarding the message to a preselected one of the ranked pair of alternative next hop routes of that corresponding entry, and in the event that step (j) fails, (k) replacing the content of the virtual source information element of the message with its own node identity and performing step (c).

The present invention is advantageous vis-a-vis Spiegel et al. in that a setup packet does not contain a source route field, thus reducing the packet overhead, and the node routing table does not contain sets of complete end-to-end routes, thus reducing the size of the routing table; and furthermore in that limiting each node to only a primary and a secondary route to a destination node enables an elegant binary pointer arrangement to be used for determining which of the routes is to be used for forwarding a packet depending upon whether the node recognises its own identity in the virtual source field of the packet.

The present invention is advantageous vis-a-vis Heggestad in that the network administration can establish a first choice route from a particular node to a destination node which has no node or link in common with a first choice route from another node to that destination node and for which that particular node is an intermediate node. By the use of the virtual source field of the present invention a node is able to determine whether it is to act in transit mode or in source mode and immediately know which outgoing link it has to test for blocking.

Preferably, for each said pair of alternative next hop routes, the two routes are node-disjoint routes.

Preferably substep (h) further comprises changing the state of a flag in a crankback information element of the message, and step (f) further comprises an initial substep (I) of checking whether the state of the crankback flag is indicative that the higher ranking route has already been attempted for that message.

In accordance with another aspect of the present invention, there is provided a node for use in a communications network of interconnected nodes, the node having a respective routing table containing respective entries corresponding to source node/destination node pairs, each entry being in the form of a ranked pair of alternative next hop routes, and being arranged:

to generate messages, each message having a destination information element containing the identity of a destination node for that message, a source information element containing the identity of the source node of that message, and a virtual source information element initially containing the identity of that source node, and each of the nodes;

to compare its own node identity with the destination node identity of a message to be routed; and, when it is not the destination node for that message;

to compare its own node identity with the virtual source node identity of that message;

to operate in source mode in the event of a match between its own node identity and the virtual source node identity by accessing its routing table in accordance with the virtual source node/destination node pair of that message to find the corresponding entry, forwarding the message to the higher ranking next hop route of that corresponding entry, and in the event that that higher ranking next hop route is not available, forwarding the message to the lower ranking next hop route of that corresporiding entry, and in the event that that lower ranking next hop route is not available, replacing the content of the virtual source information element of the message with the node identity of the node from which that message was received, and sending that message back to that node from which it was received;

to operate in transit mode in the event of a mismatch between its own node identity and the virtual source node identity by accessing its routing table in accordance with the virtual source node/destination node pair of that message to find the corresponding entry, forwarding the message to a preselected one of the ranked pair of alternative next hop routes of that corresponding entry, and in the event that that preselected one of the ranked pair of alternative next hop routes is unavailable, replacing the content of the virtual source information element of the message with its own node identity and operating in source mode for that message.

In accordance with a further aspect of the present invention, there is provided a communications network of interconnected nodes, each of the nodes being as defined in the preceding paragraph.

BRIEF DESCRIPTION OF THE DRAWINGS

A specific embodiment of a method in accordance with the present invention will now be described by way of example with reference to the drawings, in which:—

FIG. 2 shows information elements of a message; and

FIGS. 3 to 6 respectively show routing tables of some of the nodes of the network of FIG. 1.

DETAILED DESCRIPTION OF EXEMPLARY EMBODIMENTS

Before proceeding to the detailed description, the reader may find it useful to have definitions of some of the terms in this art.

Crankback refers to a mechanism for re-routing circuits which have either been broken due to the failure of some network element, or else have been unable to be established along their designated routes because of a change in network conditions since the 'topology state database' from which the routes were computed was last updated.

Crankback to source is when a call arrives at a switch (i.e. node) but it cannot be forwarded to the next switch designated in its designated transit list (DTL) or other route indicator (referred to as a routing table herein), and a message is sent to the originating switch of the DTL or the call, requiring the call to be re-routed on a separate route.

Hop by hop crankback is when a call arrives at a switch and it cannot be forwarded to the next stage on its route, a message is sent to the previous switch on the route requiring the call to be re-routed in such a way as to avoid the switch where it previously stalled.

Limited loop prevention is where, if a switch attempts to route a call setup request (message) back to the switch from which it has just received that call setup, i.e. attempts to perform a "u-turn", then this condition will be recognised and the switch will be prevented from sending the request to that switch.

Figure 1:
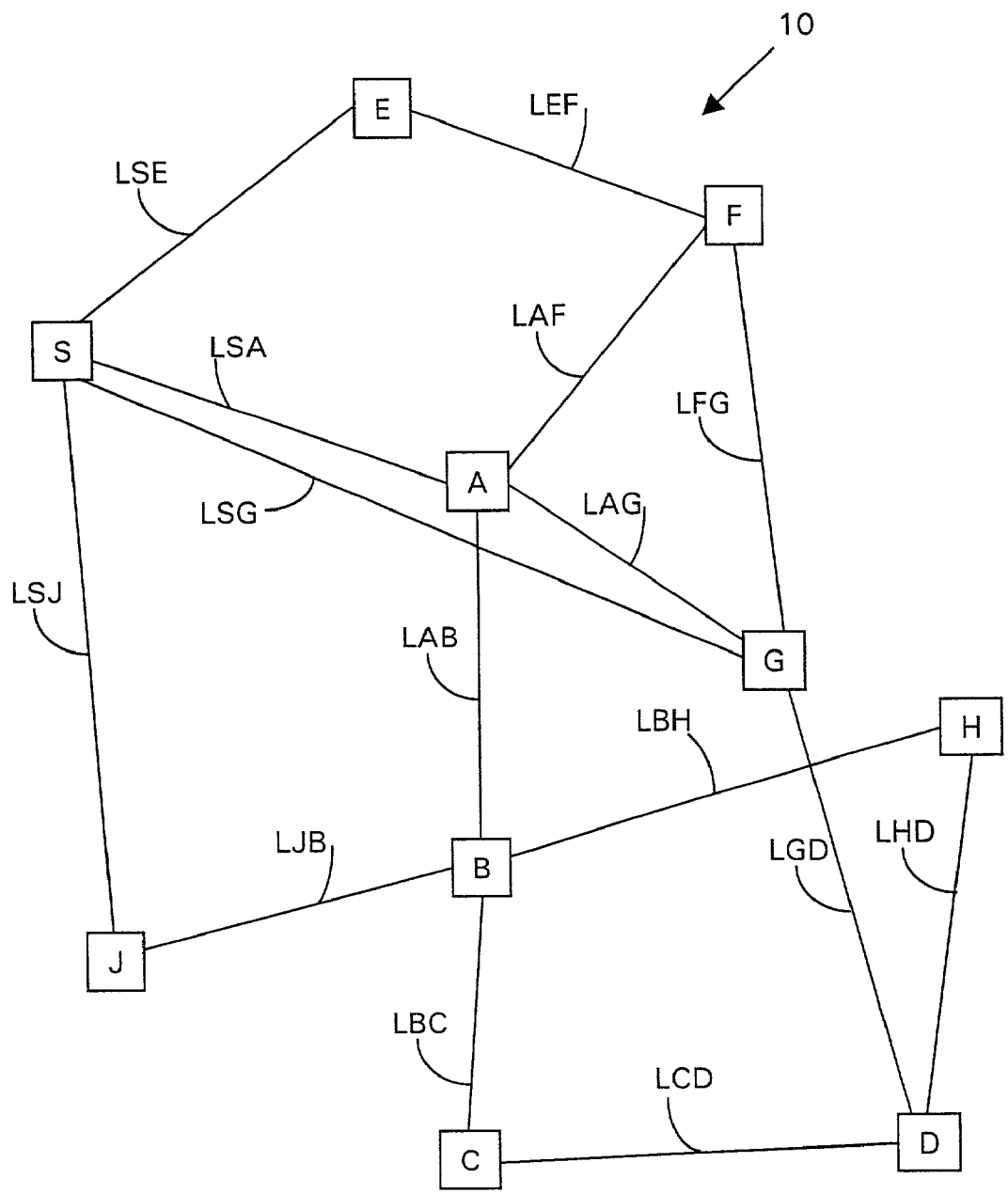
FIG. 1 shows part of a sparsely connected network.

In FIG. 1, a network 10 comprises a multiplicity of switching nodes NX, where X is a node identifier, and interconnecting links LXY, where X and Y are terminating node identifiers for that link. As an example, the link interconnecting nodes NS and NA is arbitrarily designated LSA, although it could equally be designated LAS.

The nodes NX are arranged to switch traffic being carried in accordance with international standards for asynchronous transfer mode (ATM), and although, for convenience, only ten nodes are shown, in a practical network, there will be many more nodes, e.g. in the planned UK ATM network there will be about 100 nodes. The present invention is not limited to ATM networks, thus in variants the nodes can be arranged for switching traffic being carried in accordance with other standards, e.g. plesiochronous digital hierarchy or synchronous digital hierarchy using CCITT No 7 signalling system, and packet switching systems.

The network 10 is partially meshed, in other words, not every node NX is connected to every other node NX. If the network were fully meshed, also known as a fully connected, or fully interconnected network, there would be n(n−1)/2 links LXY where n is the total number of nodes in the network, but in situations where the present invention is particularly advantageous, the network 10 has considerably fewer links LXY, and such a network is referred to as a sparsely connected network. Typically, a sparsely connected network has less than half the number of links LXY of a fully meshed network.

To illustrate the routing method of the present invention, one of the nodes is designated as a source node NS, another node is designated as a destination node ND, the other nodes in FIG. 1 are designated NA, NB, NC, NE, NF, NG, NH and NJ.

In a sparsely connected network, each of the nodes stores, for use in routing messages for which it is the actual or the virtual source, a respective set of ranked alternative routes, comprising a respective primary pre-planned route and at least a secondary planned route, to each other of the nodes. As described in more detail below, the primary, i.e. highest ranking, route is to be tried first for calls for which the node is the actual source or the virtual source, and, when the primary route is not available, e.g. because of a link failure or a node failure, the next highest ranking route is tried, and so on, depending upon the number of alternative routes in the set.

In this embodiment, the routes in each respective set are node-disjoint routes, in other words, other than the source and destination nodes, they do not have any other node in common. However, in some sparsely connected networks it may not be possible or desirable for all the routes in a set to be node-disjoint routes, but the present invention will still work advantageously.

Suppose that there is a new call at node NS for node ND, and that the primary route is via link LSA to node NA, link LAB to node NB, link LBH to node NH, and finally link LHD to node ND and the secondary route is via link LSE to node NE, link LEF to node NF, link LFG to node NG, and finally link LGD to node ND.

Figures 2, 6:
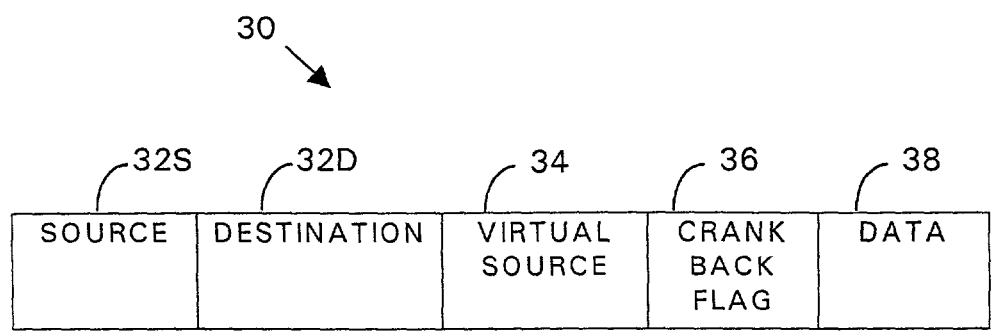

The node NS will generate a Setup Request message 30, also known as a Routing Request, shown in FIG. 2, comprising the known information elements 32 of the standard ATM Setup Request message, e.g. for source node identity 32S, destination node identity 32D, and an information element for data 38. The message 30 includes an additional information element 34, which will be referred to as the virtual source information element, and an additional information element 36 containing a crankback flag whose normal state is reset. When a node acts as source node and generates the Setup Request message 30, it will insert its own identity in the normal information element 32S for source node identity and also in the virtual source information element 34.

Each node NX has a respective routing table 20 (e.g. routing table 20S shown in FIG. 3) comprising a first column for the identity of the virtual source node. In practice, the node will retrieve the contents of the virtual source information element 34 of any Setup Request message 30 that it handles, and refer to the routing table 20 on the basis of the retrieved contents. This means that when it generates a Setup Request message 30, the contents of the virtual source information element 34 will initially be its own identity. Otherwise, the virtual source node identity in information element 34 of a received Setup Request message 30 will depend upon the routing history of the received Setup Request message 30. The routing table 20 has a second column for the identity of the destination node, and a third column for the identity of the adjacent node to which the message is to be forwarded. In this embodiment, this third column is referred to as the Address column, and its entries are node identities. In a variant, as is known in the art, another way of identifying the outgoing route is by outgoing link identity.

In each routing table 20 there is a single entry for each source/destination pair in which the source identity is not that of the associated node in the first column for each other node NX, but there are always two entries, a primary route and a secondary route, and possibly one or more further routes, for each destination node for the node NX at which that routing table is resident.

Figure 3:
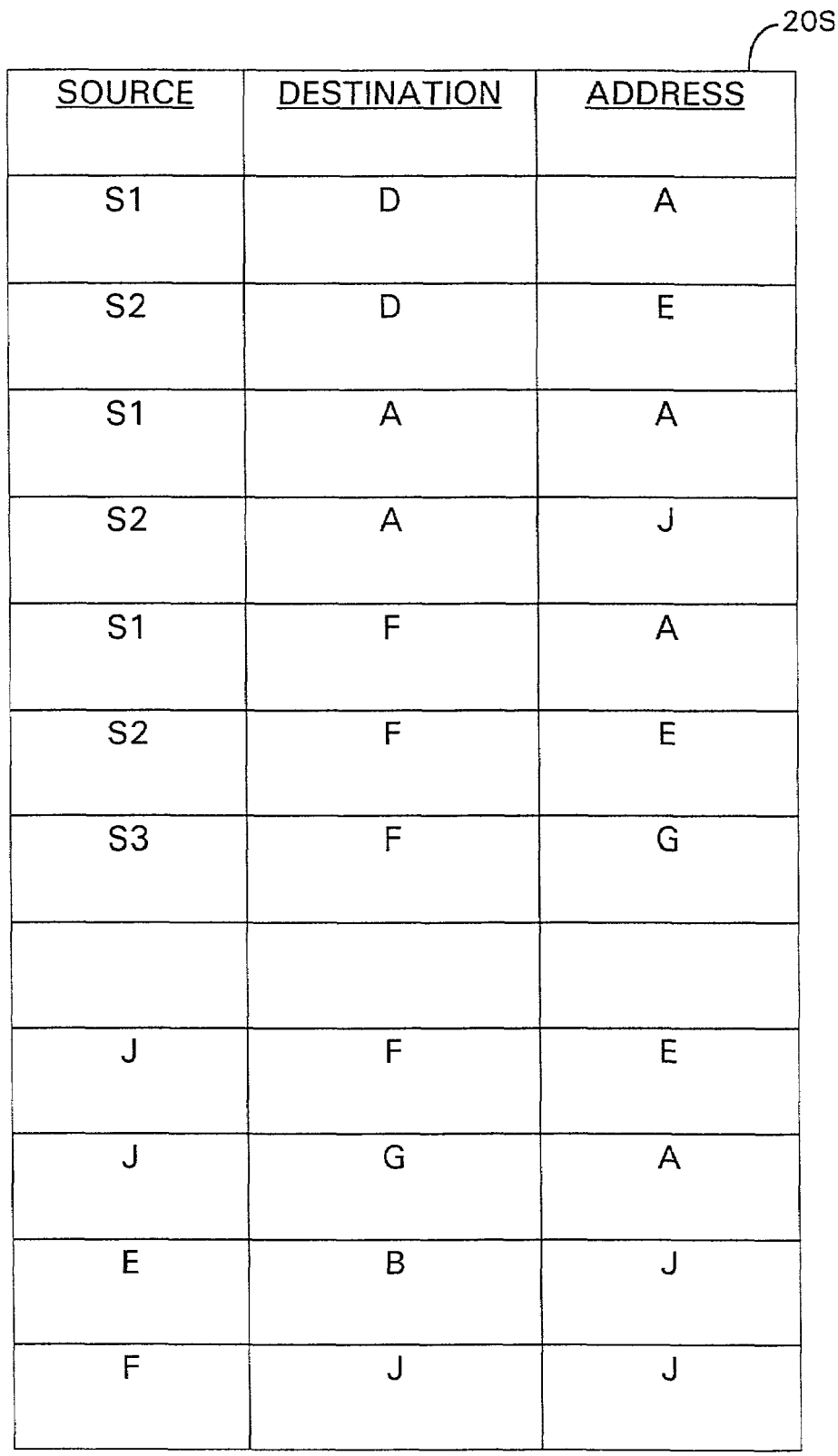

The routing table 20S of source node NS is shown in FIG. 3. For the ten node network 10 of FIG. 1, there will be nine source/destination pairs (S/X) but only the sets for the source/destination pairs for the nodes ND, NA and NF are shown. In the routing table 20S, the set S/D contains a primary route S1 and a secondary route S2, as does the set S/A, but the set S/F contains an additional tertiary route S3.

For destination node ND, the address for the first entry, primary route S1, is A, and the address for the second entry, secondary route S2, is E. The routing table 20S also contains, for each of the nine destination nodes reachable from node NS, a respective single entry for the other eight nodes for which node NS is a transit node F. For example, for node NF as destination, there are theoretically entries for nodes NA, NB, NC, ND, NE, NG, NH and NJ, but only the last of these is shown in FIG. 3.

Figure 4:
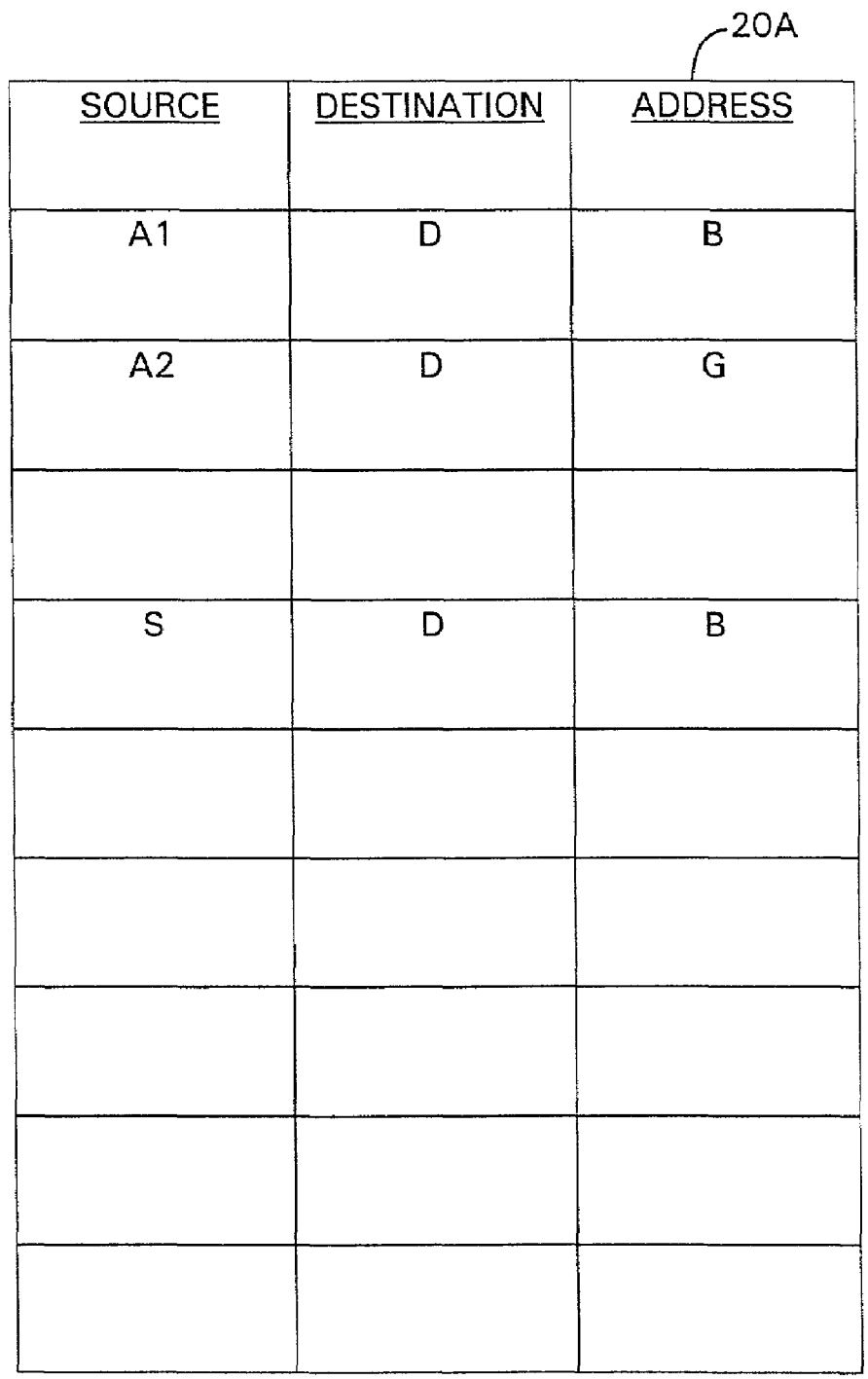

The source node NS will send the Setup Request message to the node having the address, i.e. identity, A, associated with S1 in the routing table 20S at the source node NS. Upon receipt of this message, node NA will, in usual manner, retrieve the identity of the destination node from the destination information element 32D and check to see whether the destination node identity matches the node identity NA, i.e. whether node NA is to capture the message for an associated terminal or whether it is to send the message on to another node in the network. If node NA is not the destination node for that message, it will then, if it has not already done so, retrieve the identity of the virtual source node from the virtual source information element 34, access its routing table 20A, FIG. 4, in respect of the source/destination pair SD, using the retrieved virtual source node identity, find only a single entry, having the address B, and forward the message to node NB.

Upon receipt of this message, node NB will similarly check to see if it is the destination for that message, read the identity of the virtual source node from the virtual source information element 34, access its routing table 20B, FIG. 5, in respect of the source/destination pair SD, using the retrieved virtual source node identity, find only a single entry, having the address H, and forward the message to node NH. Node NH will perform the same steps, and similarly forward the message to the destination node ND.

Assuming now that there is a fault, either at the node NH or in the link LBH, and that node NB ascertains by known means, e.g. alarm messages, failure messages or a timeout, that the attempt to forward the Setup Request message to node NH has failed. Node NB now does two things: it replaces, i.e. overwrites, the current, i.e. in this case, initial, contents (S) of the virtual source information element 34 with its own node identity, B; and it accesses its routing table 20B to find the set, in this case, pair, of entries, B1 (H) and B2 (C), for the source/destination pair BD, disregards the route which it now knows is a failure route, i.e. in this case, the route to node NH, and retrieves the address, C, of the route which has not yet been tried. In other words, the primary route from node NB to node ND is, in this case, part of the primary route from node NS to node ND, so the address for the first entry B1 is H, and the address for the second entry B2 is C.

The nodes of network 10 are arranged to prevent a "u-turn", i.e. where a transit node for whatever reason routes the message back along the route from which it was received. In some networks, the nodes may not be so arranged, and in this case when such a node receives back a message that it has just sent, i.e. the route involves a "u-turn", this, inter alia, constitutes the route to that next transit node being unavailable.

In variants, it is not always the case that the primary route from node NB to node ND is part of the primary route from node NS to node ND, and it may be that the primary route from node NB to node ND will be via node NC, and the secondary route from node NB to node ND will be via node NH. In this case, when the route via node NH is unavailable or involves a u-turn, as mentioned above, node NB will note that the secondary route from node NB to node ND via node NH has already been tried, and upon replacing the current contents (S) of the virtual source information element 34 with its own node identity, B, it will send the modified message via the primary route via node NC to node ND.

Node NB now forwards the modified Setup Request message to node NC.

Upon receipt of the message, node NC first checks whether it is the destination node for that message, and then using the retrieved identity of the virtual source information element 34, accesses its routing table 20C, FIG. 6, in respect of the source/destination pair BD, find only a single entry having the address D, and forward the message to the destination node ND.

If, however, there is a fault at node NC, then node NB will have failed to find a route to the destination node ND on both its primary and its secondary routes. There being no further alternative routes in the set B/D, node NB now proceeds to overwrite the current contents (B) of the virtual source information element 34 with the identity of the preceding node NA, A and to change the state of the crankback flag in the crankback information element 36 from reset state to set state. Node NB then sends the modified Setup Request message 30 back to the preceding node NA. Node NA responds to receipt of this modified Setup Request message 30 by then similarly performing the steps of the present invention in accordance with the current contents of the virtual source information element 34, which it will match with its own node identity and proceed on the basis that it is the source of that message.

Thus, node NA does the same thing and it accesses its routing table 20A to find the second entry, A2, for the source/destination pair AD, and retrieves the address, G. The presence of the crankback flag in a set state in the crankback information element 36 causes the node NA to ignore the entry that has already been used, i.e. the first entry A1, and go straight to the second entry, A2.

Using the same method, node NG will treat the message as coming from a source A, find the address, D, corresponding to source/destination pair AD, and attempt to route the message to destination node ND.

To sum up, each node has a routing table with three columns, one for the identity of the virtual source node, the second for the identity of the destination node, and the third for the identity of the next node in the route to that destination node. For traffic originating at a node there are always for each destination node at least two entries, the primary and secondary routes, but for transit traffic there is only a single entry for each destination node, i.e. only one of the routes being permitted for use, this being usually, but not always, the primary route from that node to the destination node.

The above described method has following advantages:
(i) it allows loop free routes to be specified for sparsely connected networks under single element, i.e. node or link, failure conditions with only a limited loop prevention mechanism in operation.
(ii) it minimises the operation of crankback under single element failure conditions.
(iii) it can operate successfully with either "crankback to source" or "hop by hop crankback" under failure conditions.

(iv) if used with "hop by hop crankback" it will lead to shorter alternative routes than source routing, but will provide the same resilience advantages as source routing.

(v) it could be used to implement load sharing.

(vi) provided that the source routes are node disjoint, for each source-destination combination, only one routing table entry may be needed at every switch except for the source switches, which always require a set of at least two.

What is claimed is:

1. A method of routing a message in a communications network of interconnected nodes, the nodes being arranged to generate messages, each message having a destination information element containing the identity of a destination node for that message, a source information element containing the identity of the source node of that message, and a virtual source information element initially containing the identity of that source node, and each of the nodes having a respective routing table containing respective entries corresponding to source node/destination node pairs, each entry being in the form of a ranked pair of alternative next hop routes, the method comprising a said node:

(a) comparing its own node identity with the destination node identity of a message to be routed; and, when it is not the destination node for that message, (b) comparing its own node identity with the virtual source node identity of that message, and, if there is a match at step (b), (c) operating in source mode, else, (d) operating in transit mode;

wherein step (c) comprises the substeps of (e) accessing its routing table in accordance with the virtual source node/destination node pair of that message to find the corresponding entry, (f) forwarding the message to the higher ranking next hop route of that corresponding entry, and in the event that step (f) fails, (g) forwarding the message to the lower ranking next hop route of that corresponding entry, and in the event that step (g) fails, (h) replacing the content of the virtual source information element of the message with the node identity of the node from which that message was received, and (i) sending that message back to that node from which it was received; and wherein step (d) comprises the substeps of (j) accessing its routing table in accordance with the virtual source node/destination node pair of that message to find the corresponding entry, (k) forwarding the message to a preselected one of the ranked pair of alternative next hop routes of that corresponding entry, and in the event that step (k) fails, (l) replacing the content of the virtual source information element of the message with its own node identity and performing step (c).

2. A method as claim 1, wherein for each said pair of alternative next hop routes, the two routes are node-disjoint routes.

3. A method as in claim 1, wherein substep (h) further comprises changing the state of a flag in a crankback information element of the message, and step (f) further comprises initially checking whether the state of the crankback flag is indicative that the higher ranking route has already been attempted for that message.

4. A node for use in a communications network of interconnected nodes, the node having a respective routing table containing respective entries corresponding to source node/destination node pairs, each entry being in the form of a ranked pair of alternative next hop routes, and being arranged:

to generate messages, each message having a destination information element containing the identity of a destination node for that message, a source information element containing the identity of the source node of that message, and a virtual source information element initially containing the identity of that source node;

to compare its own node identity with the destination node identity of a message to be routed; and, when it is not the destination node for that message;

to compare its own node identity with the virtual source node identity of that message;

to operate in source mode in the event of a match between its own node identity and the virtual source node identity by accessing its routing table in accordance with the virtual source node/destination node pair of that message to find the corresponding entry, forwarding the message to the higher ranking next hop route of that corresponding entry, and in the event that that higher ranking next hop route is not available, forwarding the message to the lower ranking next hop route of that corresponding entry, and in the event that that lower ranking next hop route is not available, replacing the content of the virtual source information element of the message with the node identity of the node from which that message was received, and sending that message back to that node from which it was received;

to operate in transit mode in the event of a mismatch between its own node identity and the virtual source node identity by accessing its routing table in accordance with the virtual source node/destination node pair of that message to find the corresponding entry, forwarding the message to a preselected one of the ranked pair of alternative next hop routes of that corresponding entry, and in the event that that preselected one of the ranked pair of alternative next hop routes is unavailable, replacing the content of the virtual source information element of the message with its own node identity and operating in source mode for that message.

5. A node as in claim 4, further arranged to respond to no route being available, by changing the state of a flag in a crankback information element of the message, and to respond to receipt of a message containing a crankback flag in a changed state, by ignoring the alternative route that had previously been used for that message.

6. A communications network comprising a plurality of interconnected nodes each node being as described in claim 4.

* * * * *